US009678991B2

(12) United States Patent
Sohn et al.

(10) Patent No.: US 9,678,991 B2
(45) Date of Patent: Jun. 13, 2017

(54) APPARATUS AND METHOD FOR PROCESSING IMAGE

(71) Applicant: SAMSUNG ELECTRONICS CO., LTD., Suwon-si (KR)

(72) Inventors: Young-wook Sohn, Yongin-si (KR); Hye-moon Kim, Yongin-si (KR); Jae-hyeok Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 41 days.

(21) Appl. No.: 14/529,294

(22) Filed: Oct. 31, 2014

(65) Prior Publication Data

US 2015/0242442 A1 Aug. 27, 2015

(30) Foreign Application Priority Data

Feb. 24, 2014 (KR) ........................ 10-2014-0021485

(51) Int. Cl.

*G06T 5/00* (2006.01)
*G06F 17/30* (2006.01)
*G06K 9/00* (2006.01)
*G06T 7/11* (2017.01)

(52) U.S. Cl.

CPC .. *G06F 17/30262* (2013.01); *G06F 17/30589* (2013.01); *G06K 9/00697* (2013.01); *G06T 5/00* (2013.01); *G06T 7/11* (2017.01); *G06T 2207/30201* (2013.01)

(58) Field of Classification Search

CPC ............................. G06F 17/30589; G06T 7/11
See application file for complete search history.

(56) References Cited

U.S. PATENT DOCUMENTS 6,480,538 B1 * 11/2002 Trovato .................... G06T 9/00 375/240.01
6,731,823 B1 * 5/2004 Gallagher ............ H04N 1/4092 358/521
6,785,421 B1 * 8/2004 Gindele ........... G06F 17/30259 382/119

(Continued)

FOREIGN PATENT DOCUMENTS

JP 2001-229395 A 8/2001
JP 2003-248825 A 9/2003

(Continued)

OTHER PUBLICATIONS

Chang et al. "Color-Texture Segmentation of Medical Images Based on Local Contrast Information" Proceedings of the 2007 IEEE Symposium on Computational Intelligence in Bioinformatics and Computational Biology (2007) pp. 1-6 (488-493).*

*Primary Examiner* — Chan Park
*Assistant Examiner* — Mia M Thomas
(74) *Attorney, Agent, or Firm* — Sughrue Mion, PLLC

(57) ABSTRACT

Provided are an image processing apparatus and an image processing method thereof. The image processing method extracts at least one texture area from an input image according to at least one texture feature of an object, processing, for each texture area of the extracted at least one texture area, the texture area using an image set value respectively corresponding to the texture area, and combining the at least one texture area that is processed by the processing and outputting the combined at least one texture area.

17 Claims, 11 Drawing Sheets

START
RECEIVE IMAGE ~S710
EXTRACT AT LEAST ONE TEXTURE AREA FROM RECEIVED IMAGE ACCORDING TO TEXTURE FEATURE OF OBJECT ~S720
PROCESS EACH TEXTURE AREA BY APPLYING IMAGE SET VALUE CORRESPONDING TO EACH TEXTURE AREA ~S730
COMBINE EACH PROCESSED TEXTURE AREA ~S740
OUTPUT IMAGE ~S750
END

(56) References Cited

U.S. PATENT DOCUMENTS 6,832,000 B2 * 12/2004 Herman .................. G06T 5/001 382/164
6,903,782 B2 * 6/2005 Herman ................. H04N 19/85 345/589
7,062,083 B2 * 6/2006 Lim .................... G06F 17/3025 382/164
8,498,480 B2 * 7/2013 Bentrem ............... G06T 7/0081 382/164
8,620,082 B1 * 12/2013 Cobb .................... G06T 7/0081 342/73
9,098,926 B2 * 8/2015 Quan ................. G06K 9/00704
9,262,826 B2 * 2/2016 Khachaturian ........ A61B 5/742
2001/0019631 A1 * 9/2001 Ohsawa ............... G06K 9/6207 382/242
2002/0090133 A1 * 7/2002 Kim ....................... G06K 9/342 382/164
2002/0102017 A1 * 8/2002 Kim ....................... G06K 9/342 382/164
2002/0176610 A1 * 11/2002 Okazaki ............. G06K 9/00221 382/118
2003/0185432 A1 * 10/2003 Hong ................... G06K 9/6282 382/151
2004/0095613 A1 * 5/2004 Kuwabara ............ H04N 1/1903 358/450
2008/0152243 A1 * 6/2008 Min ..................... H04N 19/172 382/243
2008/0199106 A1 * 8/2008 Akatsuka .......... G06F 17/30262 382/305
2009/0034824 A1 * 2/2009 Li ......................... G06T 7/0012 382/133
2009/0060277 A1 * 3/2009 Zhang ................ G06K 9/00711 382/103
2009/0102805 A1 * 4/2009 Meijer .................... G06F 3/016 345/173
2010/0160835 A1 * 6/2010 Shin ..................... A61B 5/4561 600/595
2010/0177929 A1 * 7/2010 Kurtz ................. G06K 9/00228 382/103
2010/0183225 A1 * 7/2010 Vantaram .............. G06T 7/0081 382/173
2010/0290712 A1 * 11/2010 Furuta ..................... G06T 15/04 382/244
2011/0002557 A1 * 1/2011 Kim ................... H04N 13/0221 382/285
2012/0146998 A1 * 6/2012 Kim ...................... G06T 19/006 345/419
2012/0201417 A1 * 8/2012 Park ...................... G06F 3/0304 382/103
2012/0301018 A1 * 11/2012 Lee ....................... G06T 7/0071 382/164
2013/0002818 A1 * 1/2013 Choi ....................... G06T 5/005 348/43
2013/0084014 A1 * 4/2013 Huang .................... G06T 3/403 382/199
2013/0101223 A1 * 4/2013 Kawanishi ............... H04N 5/91 382/195
2013/0188871 A1 * 7/2013 Huang ................. G06K 9/4671 382/173
2013/0195361 A1 * 8/2013 Deng .................. G06K 9/4671 382/195
2013/0265608 A1 * 10/2013 Yoshida ............. G06K 15/1878 358/2.1
2014/0140611 A1 * 5/2014 Yasuoka ............... G06T 3/4007 382/159
2014/0301649 A1 * 10/2014 Zhang ................... G06T 7/0002 382/199
2015/0070558 A1 * 3/2015 Okamori ............ H04N 5/23293 348/333.1
2015/0323995 A1 * 11/2015 Lim ........................ G06F 3/016 345/174
2016/0042250 A1 * 2/2016 Cordova-Diba ..... G06K 9/6215 382/180

FOREIGN PATENT DOCUMENTS

JP 2009-134410 A 6/2009
KR 10-1191319 B1 10/2012

* cited by examiner

FIG. 4

| OBJECT TYPE | TEXTURE TYPE | DE | SR | BRIGHTNESS | .... |
|---|---|---|---|---|---|
| PERSON | FACE | $DE_1$ | $SR_1$ | $B_1$ | |
| | CLOTHES | $DE_2$ | $SR_2$ | $B_2$ | |
| | ⋮ | ⋮ | ⋮ | ⋮ | |
| Text | SUBTITLE | $DE_3$ | $SR_3$ | $B_3$ | |
| | Logo | $DE_4$ | $SR_4$ | $B_4$ | |
| | ⋮ | ⋮ | ⋮ | ⋮ | |
| NATURE | SKY | $DE_5$ | $SR_5$ | $B_5$ | |
| | LAWN | $DE_6$ | $SR_6$ | $B_6$ | |
| | ⋮ | ⋮ | ⋮ | ⋮ | |

FIG. 6

| OBJECT TYPE | TEXTURE TYPE | DE | SR | BRIGHTNESS | .... |
|---|---|---|---|---|---|
| PERSON1 | FACE | $DE_1$ | $SR_1$ | $B_1$ | |
| | CLOTHES | $DE_2$ | $SR_2$ | $B_2$ | |
| | ⋮ | ⋮ | ⋮ | ⋮ | |
| PERSON | FACE | $DE_3$ | $SR_3$ | $B_3$ | |
| | CLOTHES | $DE_4$ | $SR_4$ | $B_4$ | |
| | ⋮ | ⋮ | ⋮ | ⋮ | |
| NATURE | SKY | $DE_5$ | $SR_5$ | $B_5$ | |
| | LAWN | $DE_6$ | $SR_6$ | $B_6$ | |
| | ⋮ | ⋮ | ⋮ | ⋮ | |

APPARATUS AND METHOD FOR PROCESSING IMAGE

CROSS-REFERENCE TO RELATED APPLICATION

This application claims priority from Korean Patent Application No. 10-2014-0021485, filed on Feb. 24, 2014 in the Korean Intellectual Property Office, the disclosure of which is incorporated herein by reference in its entirety.

BACKGROUND

Field

Apparatuses and methods consistent with exemplary embodiments relate to processing an image, and more particularly, to processing an image according to a texture feature of an object.

Description of the Related Art

In order to reinforce an expression of a texture feature of an image in the related art, the image is processed using diverse methods. For example, a related art image processing apparatus may reinforce the expression of a texture feature of an image by processing the image using a detail enhancement method and a super resolution method.

However, these methods are limited in expressing texture to a desired level since these methods consider only a general item of the image (e.g., a characteristic corresponding to an entirety of the image), such as a high frequency feature. More specifically, since the related art methods apply the same setting to the entire screen, the setting may be effective for one portion of the screen but ineffective for another portion that has a set value that is not suitable for its feature so that the image quality enhancement effect may be reduced.

To address this problem, a method of dividing an image and applying an image set value for image quality enhancement to a portion of the divided image may be performed. However, this method also gives the image quality enhancement effect to only the portion of the image to which the image set value for image quality enhancement is applied, but does not give the image quality enhancement effect to other portions. In addition, this method applies the same image set value even when different image processing is suitable according to objects (for example, a lawn and green clothes) so that an unnatural image may be output.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

Aspects of one or more exemplary embodiments provide an image processing apparatus capable of providing a user with a clearer image quality by processing an image by applying different image set values according to texture features, and an image processing method thereof.

According to an aspect of an exemplary embodiment, there is provided an image processing method including: extracting at least one texture area from an input image according to at least one texture feature of an object; for each texture area among the extracted at least one texture area, processing the texture area using an image set value respectively corresponding to each texture area; and combining the at least one texture area that is processed by the processing and outputting the combined at least one texture area.

The extracting the at least one texture area may include: extracting the object from the input image; and extracting the at least one texture area from the extracted object.

The extracting the at least one texture area may include, for each texture area among the extracted at least one texture area, extracting information regarding an object type and a texture type of the texture area.

A plurality of image set values may be pre-stored in a database according to object types and texture types, and the processing the texture area may include searching for an image set value, from among the plurality of image set values stored in the database, corresponding to an object type and a texture type determined for the texture area based on the information regarding the object type and the texture type, and processing the texture area using the searched image set value.

The database may have a hierarchical structure in which the object types are classified at an upper level and the texture types are classified at a lower level below the object types.

The database may store different image set values according to different object types irrespective of a same texture type.

Image set values stored in the database for a plurality of texture types included in a same object may be within a predetermined value range.

The processing the texture area may include, when a specific texture area among the at least one extracted texture area is not included in the object types and the texture types stored in the database, processing the specific texture area using a predetermined image processing value.

According to an aspect of another exemplary embodiment, there is provided an image processing apparatus including: an texture area extractor configured to extract at least one texture area from an input image according to at least one texture feature of an object; an image processor configured to, for each texture area of the extracted at least one texture area, process the texture area using an image set value respectively corresponding to the texture area, and combine the at least one texture area that is processed using the image setting value; and an outputter configured to output the combined at least one texture area.

The texture area extractor may include an object extractor configured to extract the object from the input image, and a texture area separator configured to separate the at least one texture area from each extracted object.

The texture area extractor may also extract information regarding an object type and a texture type of the at least one texture area.

The image processing apparatus may further include a database configured to store a plurality of image set values according to object types and texture types, and the image processor may include: an image set value searcher configured to search for an image set value corresponding to an object type and a texture type determined for the texture area based on the information regarding the object type and the texture type, and an image set value applier configured to process the texture area by applying the searched image set value to the texture area.

The database may have a hierarchical structure in which the object types are classified at an upper level and the texture types are classified at a lower level below the object types.

The database may store different image set values according to different object types irrespective of a same texture type.

Image set values stored in the database for a plurality of texture types included in a same object may be within a predetermined value range.

When a specific texture area among the at least one extracted texture area is not included in the object types and the texture types stored in the database, the image set value applier may process the specific texture area by applying a predetermined image processing value to the specific texture area.

According to an aspect of another exemplary embodiment, there is provided an image processing method of an image processing apparatus, the method including: extracting a texture area from an input image according to a texture feature of an object; and processing the texture area using an image set value corresponding to the texture area, independently from other areas of the image.

According to aspects of one or more exemplary embodiments, the image processing apparatus processes an image according to an object and a texture feature so that a user may be provided with a clearer image quality.

Additional and/or other aspects and advantages will be set forth in part in the description which follows and, in part, will be obvious from the description, or may be learned by practice of exemplary embodiments.

BRIEF DESCRIPTION OF THE DRAWINGS

The above and/or other aspects will be more apparent by describing exemplary embodiments with reference to the accompanying drawings, in which:

FIG. 4 illustrates a database that stores image set values according to an exemplary embodiment;

FIG. 6 illustrates a database that stores image set values when there are a same type of objects according to another exemplary embodiment.

DETAILED DESCRIPTION OF EXEMPLARY EMBODIMENTS

Figure 1:
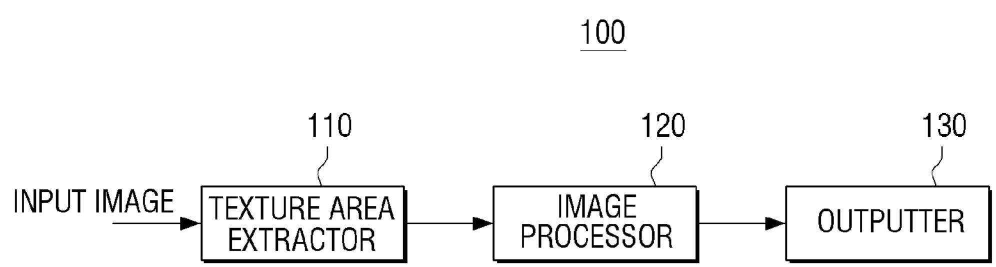
FIG. 1 is a block diagram of a configuration of an image processing apparatus according to an exemplary embodiment.

Exemplary embodiments will now be described in greater detail with reference to the accompanying drawings.

In the following description, same drawing reference numerals are used for the same elements even in different drawings. The matters defined in the description, such as detailed constructions and elements, are provided to assist in a comprehensive understanding of exemplary embodiments. Thus, it is apparent that exemplary embodiments can be carried out without those specifically defined matters. Also, well-known functions or constructions are not described in detail since they would obscure the description with unnecessary detail. Hereinafter, it is understood that expressions such as "at least one of," when preceding a list of elements, modify the entire list of elements and do not modify the individual elements of the list.

FIG. 1 is a block diagram of a configuration of an image processing apparatus 100 according to an exemplary embodiment. With reference to FIG. 1, the image processing apparatus 100 may include a texture area extractor 110, an image processor 120, and an outputter 130. The image processing apparatus 100 may be implemented with a smart television (TV), although it is understood that this is merely an exemplary embodiment and one or more other exemplary embodiments may be applied to other image processing devices (e.g., a set-top box, a standalone image processing device, an audio/video receiver, a multimedia streaming device, a network streaming device, a personal computer, a workstation, a laptop computer, a portable device, a tablet device, a mobile phone, a portable multimedia player, a personal digital assistant, a smart device, a wearable device, a television, a monitor, a projector, a touch panel, etc.).

The texture area extractor 110 may extract at least one texture area from an input image according to a texture feature of an object. The texture feature indicates a feature of texture of the object's surface. For example, if an object is a person, the person's face and clothes have different texture features.

In particular, the texture area extractor 110 may extract at least one object from an input image, and separate at least one texture area from each extracted object so that the at least one texture area may be extracted. That is, a plurality of texture areas may be extracted from the one object. For example, if an object is a person, the texture area extractor 110 may separate and extract a first texture area regarding a face and a second texture area regarding clothes from the object. At this time, the texture area extractor 110 may also extract information regarding an object type and a texture type of the respective texture area.

Subsequently, the image processor 120 may process each texture area by applying an image set value corresponding to each texture area. More specifically, the image processor 120 may determine an object type and a texture type of the extracted texture area, and search for an image set value corresponding to the determined object type and texture type from among a plurality of pre-stored image set values. In addition, the image processor 120 may apply the searched image set value to the corresponding texture area and process each texture area accordingly. That is, each texture area may be applied with a different image set value corresponding to the respective texture area. In other words, the image set value may be determined independently for each texture area. Furthermore, the image set value may be obtained for an area of the image that is determined as a texture area according to a texture feature, as described above. In addition, the image processor 120 may combine the processed texture areas and generate a single image.

The outputter 130 outputs an image processed by the image processor 120. The outputter 130 may be implemented with a display, although it is understood that this is merely an exemplary embodiment, and one or more other exemplary embodiments are not limited thereto. For example, according to another exemplary embodiment, the outputter 130 may also be implemented with an image output terminal that outputs image data to an external display apparatus.

As described above, an image is divided based on a texture feature and the divided image is processed according to the texture feature so that the user may be provided with clearer image quality.

Figure 2:
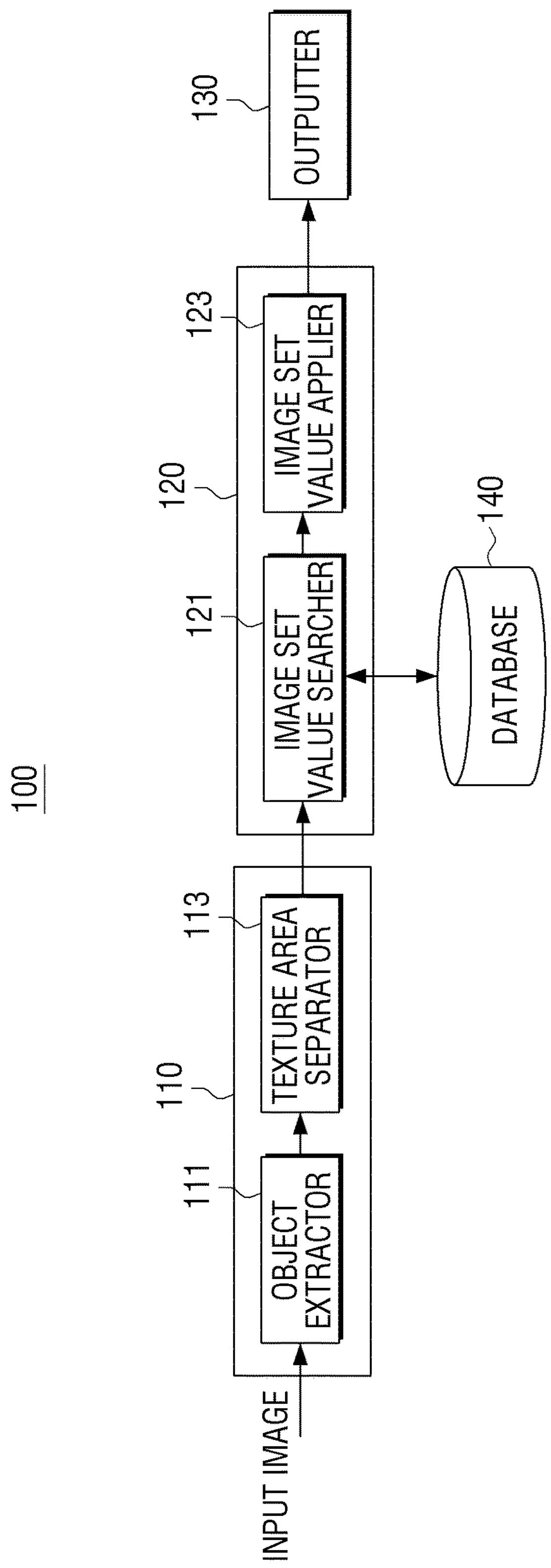
FIG. 2 is a detailed block diagram of a configuration of an image processing apparatus according to an exemplary embodiment.

The image processing apparatus 100 is described in greater detail with reference to FIGS. 2, 3A to 3C, 4, 5A to 5C, and 6. FIG. 2 is a detailed block diagram of a configuration an the image processing apparatus 100 according to an exemplary embodiment. With reference to FIG. 2, the image processing apparatus 100 may include a texture area extractor 110, an image processor 120, an outputter 130, and a database 140.

The texture area extractor 110 extracts at least one texture area from an input image according to a texture feature of an object. In particular, the texture area extractor 110 may include an object extractor 111 and a texture area separator 113 as shown in FIG. 2.

Figure 3A:
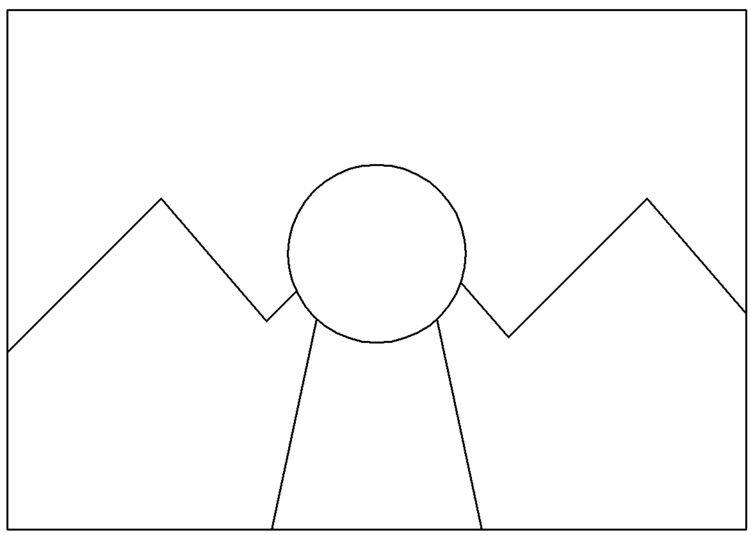
FIGS. 3A to 3C illustrate a method for extracting a texture area according to an exemplary embodiment.
Figure 3B:
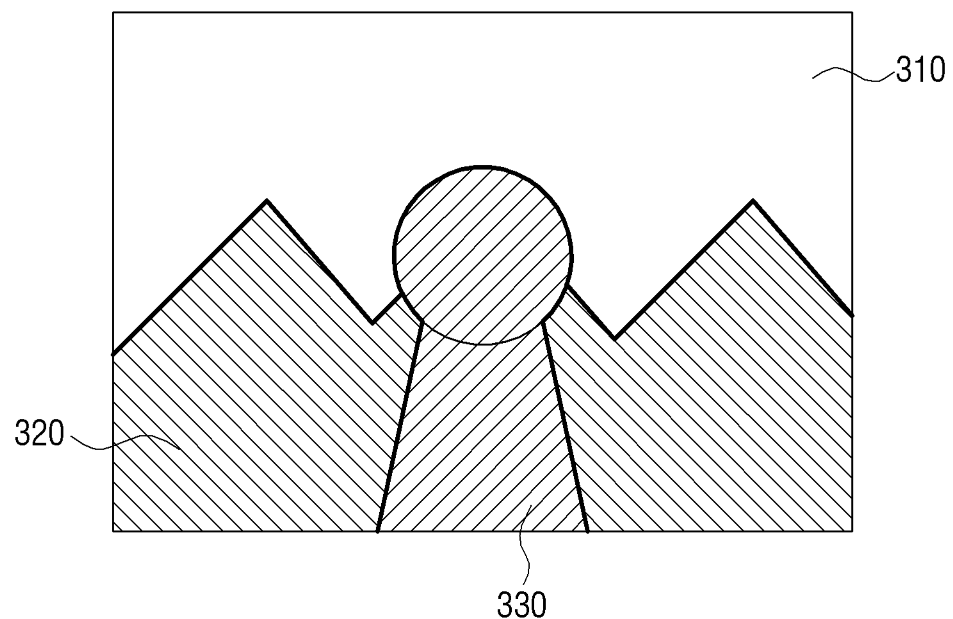

The object extractor 111 extracts an object from an input image. In an exemplary embodiment, the object extractor 111 may determine an object according to an algorithm, e.g., by determining the outline of an object by detecting pixels that are different from adjacent pixels by more than a predetermined value among the pixels of the input image. In addition, the object extractor 111 may determine a type of the object by detecting a shape and a color of the determined object. For example, when an image is input as shown in FIG. 3A, the object extractor 110 may determine the outline of an object using a change in pixel values. In addition, the object extractor 111 may extract a sky background object 310, a lawn background object 320, and a person object 330 using shapes and colors of the objects as shown in FIG. 3B.

However, it is understood that extracting an object and determining a type of the object as described above is merely an exemplary embodiment, and one or more other exemplary embodiments are not limited thereto. For example, according to another exemplary embodiment, it is also possible to extract an object and determine a type of the object using other methods. For example, the object extractor 111 may extract an object and determine a type of the object using a related-art face recognition method.

The texture area separator 113 separates at least one texture area from the extracted object. More specifically, the texture area separator 113 may separate a plurality of texture areas having different texture features in the same object. In addition, the texture area separator 113 may determine a type of a texture area using a shape, a color, and a feature of the texture area. For example, after three objects are extracted as shown in FIG. 3B, the texture area separator 113 may separate a third texture area 331 corresponding to a face and a fourth texture area 333 corresponding to clothes from a person object 330 by determining or obtaining colors and shapes of the object or the texture areas 331 and 333.

The image processor 120 performs image processing of each extracted texture area by applying an image set value corresponding to each extracted texture area. The image set value may include at least one of a detail enhancement set value, a super resolution set value, a brightness value, and the like, although it is understood that is merely an exemplary embodiment, and one or more other exemplary embodiments are not limited thereto. For example, in one or more other exemplary embodiments, other or additional image set values such as contrast range and clarity may also be applied.

In particular, the image processor 120 may include an image set value searcher 121 and an image set value applier 123 as shown in FIG. 2. The image set value searcher 121 searches for an image set value for each texture area from the database 140 that stores image set values according to the type of object and the type of texture.

According to an exemplary embodiment, the database 140 may have a hierarchical structure in which the object types are classified at an upper level and the texture types are classified at a lower level below the object types. For example, the database 140 may classify object types into person, text, nature, and so on. In addition, the database 140 may classify texture types of a person object into a face texture type, a clothes texture type, and so on. In addition, the database 140 may classify texture types of a text object into a subtitle type, a logo type, and so on. In addition, the database 140 may classify texture types of a nature object into a sky type, a lawn type, and so on. While in the present exemplary embodiment, the database 140 may be included in the image processing apparatus 100, it is understood that one or more other exemplary embodiments are not limited thereto. For example, according to another exemplary embodiment, the database (or an algorithm for determining the image set value) may be provided in a different device (e.g., a server, a workstation, etc.).

In addition, image set values for a plurality of types of textures included in the same object that are stored in the database 140 may be within a predetermined value range. More specifically, a plurality of image set values for a face texture type and a clothes texture type included in a person object type as shown in FIG. 4 may be within a predetermined value range. For example, $DE_1$, which is a detail enhancement (DE) set value of the face texture type under the person object type, and $DE_2$ of the clothes texture type may be within a predetermined value range.

If image set values for a plurality of texture types under the same object are within a predetermined value range as described above, similar image set values may be applied to the same object. Thus, unnatural image processing may be prevented.

The image set value searcher 121 may search for (e.g., obtain) an image set value corresponding to the determined object type and texture type from the database 140 based on object type information and texture type information regarding each texture area extracted by the texture area extractor 110.

Figure 3C:
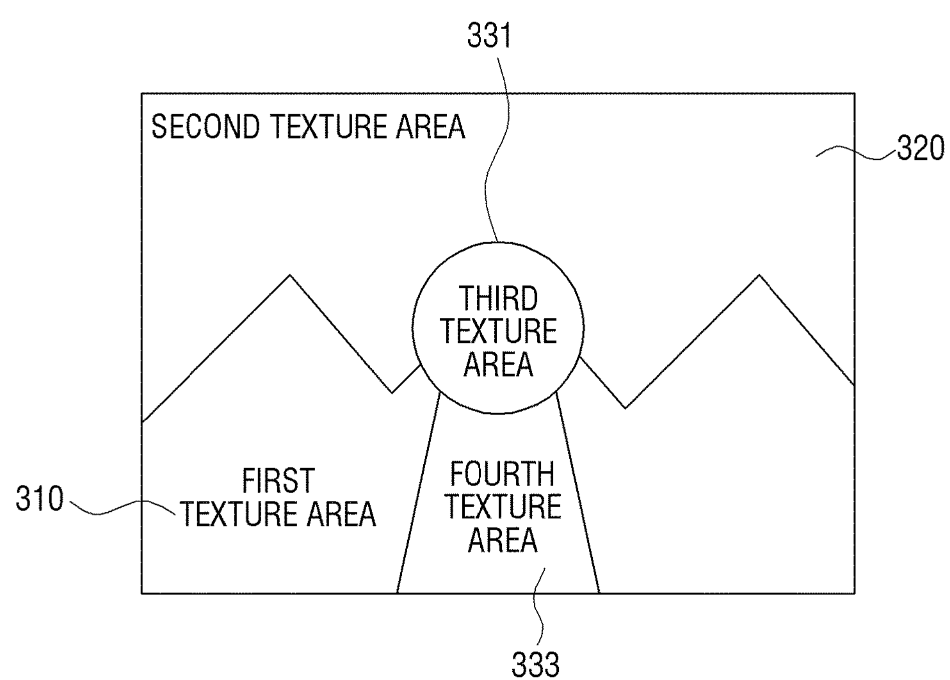

For example, when an object type of the first texture area 310 is nature and a texture type is a lawn as shown in FIG. 3C, the image set value searcher 121 may search for a DE set value as $DE_6$, a super resolution (SR) set value as $SR_6$, and a brightness set value as $B_6$ among the image set values of the first texture area 310 from the database 140. In addition, when an object type of the second texture area 320 is nature and a texture type is the sky as shown in FIG. 3C, the image set value searcher 121 may search for a DE set value as $DE_5$, an SR set value as $SR_5$, and a brightness set value as $B_5$ among the image set values of the second texture area 320 from the database 140. Furthermore, when an object type of the third texture area 331 is a person and a texture type is a face as shown in FIG. 3C, the image set value searcher 121 may search for a DE set value as $DE_1$, an SR set value as $SR_1$, and a brightness set value as $B_1$ among the image set values of the third texture area 331 from the database 140. Also, when an object type of the fourth texture area 333 is a person and a texture type is clothes as shown in FIG. 3C, the image set value searcher 121 may search for a DE set value as $DE_2$, an SR set value as $SR_2$, and a brightness set value as $B_2$ among the image set values of the fourth texture area 333 from the database 140.

The image set value applier 123 performs image processing by applying the image set value searched by the image set value searcher 121 to the corresponding texture area. For example, the image set value applier 123 may perform image processing by applying $DE_6$ which is a DE set value, $SR_6$ which is an SR set value, and $B_6$ which is a brightness set value to the first texture area 310. In addition, the image set value applier 123 may perform image processing by applying $DE_5$ which is a DE set value, $SR_5$ which is an SR set value, and $B_5$ which is a brightness set value to the second texture area 320. Furthermore, the image set value applier 123 may perform image processing by applying $DE_1$ which is a DE set value, $SR_1$ which is an SR set value, and $B_1$ which is a brightness set value to the third texture area 331. Also, the image set value applier 123 may perform image processing by applying $DE_2$ which is a DE set value, $SR_2$ which is an SR set value, and $B_2$ which is a brightness set value to the fourth texture area 333.

In addition, the image processor 120 combines all of the texture areas to which the image set values are applied, thereby generating a single piece of image data.

The outputter 130 outputs the image data generated by combining all of the texture areas to which the image set values are applied. The outputter 130 may display the image data through a display or output the image data to an external display apparatus through an image output terminal.

The image processing apparatus 100 processes an image according to the type of object and the type of texture as described above so that the user may watch a clearer image.

Furthermore, when there are the same types of objects in an image, the image processing apparatus 100 may apply a different image set value to each object.

Figure 5A:
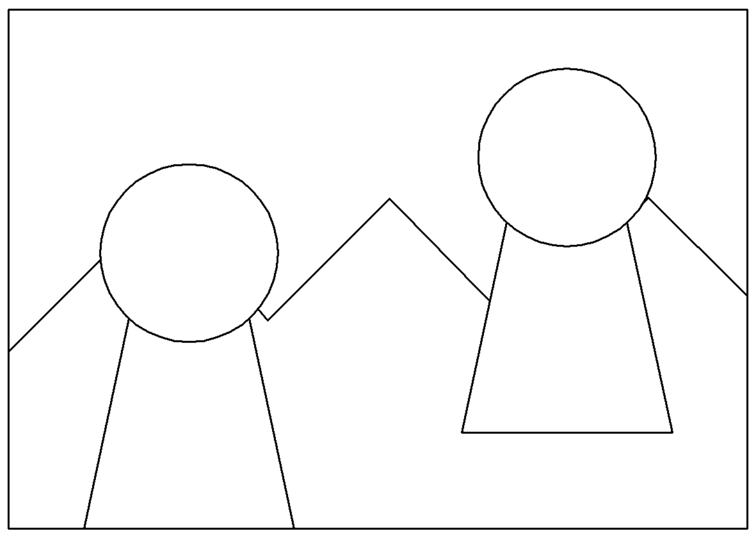
FIGS. 5A to 5C illustrate a method for extracting a texture area when there are a same type of objects.
Figure 5B:
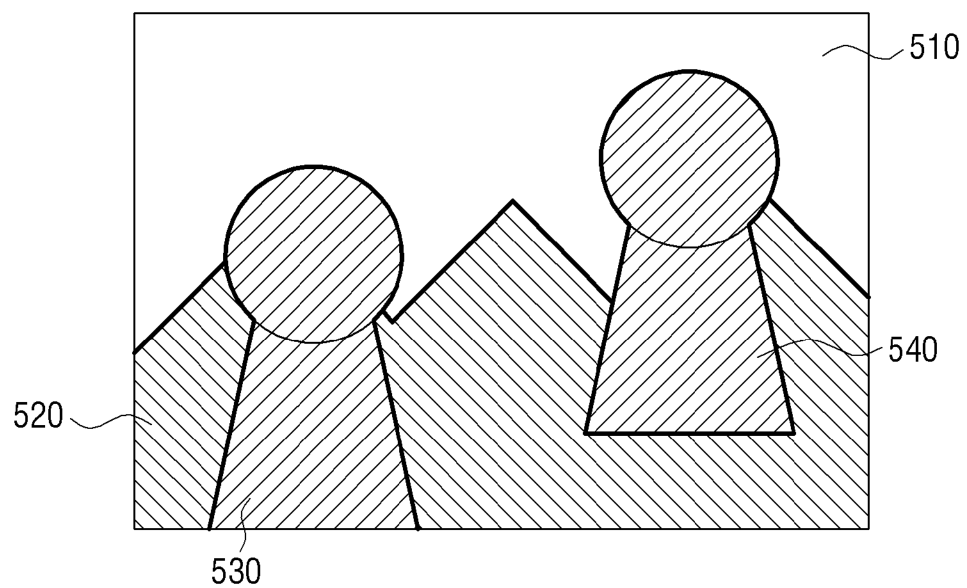

More specifically, when an image is input as shown in FIG. 5A, the object extractor 110 may determine the outline of the objects using a change or difference in pixel values. In addition, the object extractor 110 may extract a sky background object 510, a lawn background object 520, a first person object 530, and a second person object 540 using shapes and colors of the objects as shown in FIG. 5B. In addition, the object extractor 110 may determine types of the objects and relative depths of the objects, e.g., determine that the first person object 530 is located in front of the second person object 540.

Figure 5C:
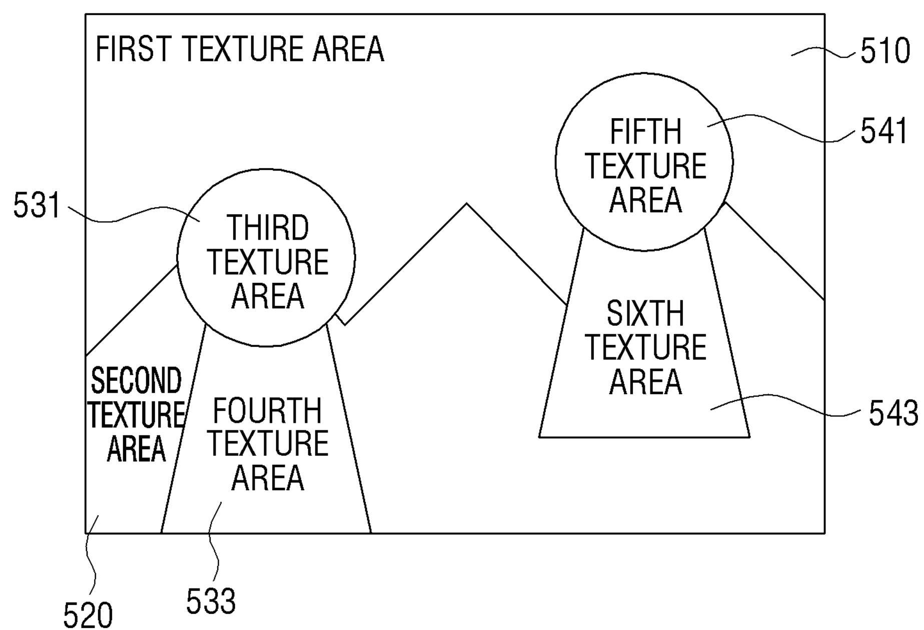

In addition, using colors and shapes of the objects, the texture area separator 113 may separate a third texture area 531 corresponding to a face and a fourth texture area 533 corresponding to clothes from the first person object 530, and separate a fifth texture area 541 corresponding to a face and a sixth texture area 543 corresponding to clothes from the second person object 540 as shown in FIG. 5C.

The image processor 120 may search for image set values corresponding to the extracted texture areas from the database 140, and apply the searched image set values to the extracted texture areas.

The database 140 may store different image set values according to at least one of positions and sizes of the objects, even when objects are of the same object type. For example, the database 140 may classify the same person object type into a "person 1" object type and a "person 2" object type according to at least one of positions and sizes of the objects as shown in FIG. 6. A person corresponding to the "person 1" object type may be located in front of or be taller than a person corresponding to the "person 2" object type. That is, the database 140 may store the same type of objects as types of objects that are different according to at least one of positions and sizes of the objects. Accordingly, the database 140 may store different image set values according to the type of the object even when objects are of the same type of texture. For example, in spite of the same face texture type, the database 140 may store a DE set value of the face texture type of the "person 1" object type as $DE_1$, store an SR set value as $SR_1$, and store a brightness set value as $B_1$, and may store a DE set value of the face texture type of the "person 2" object type as $DE_3$, store an SR set value as $SR_3$, and store a brightness set value as $B_3$.

In addition, the image set value searcher 121 may search for an image set value corresponding to the determined object type and texture type from the database 140 based on object type information and texture type information regarding each texture area extracted by the texture area extractor 110.

For example, when an object type of the first texture area 510 is nature and a texture type is the sky as shown in FIG. 5C, the image set value searcher 121 may search for a DE set value as $DE_5$, an SR set value as $SR_5$, and a brightness set value as $B_5$ among the image set values of the first texture area 510 from the database 140. In addition, when an object type of the second texture area 520 is nature and a texture type is a lawn as shown in FIG. 5C, the image set value searcher 121 may search for a DE set value as DE6, an SR set value as SR6, and a brightness set value as B6 among the image set values of the second texture area 520 from the database 140. Also, when an object type of the third texture area 531 is "person 1" and a texture type is a face as shown in FIG. 5C, the image set value searcher 121 may search for a DE set value as DE1, an SR set value as SR1, and a brightness set value as B1 among the image set values of the third texture area 531 from the database 140. Furthermore, when an object type of the fourth texture area 533 is "person 1" and a texture type is clothes as shown in FIG. 5C, the image set value searcher 121 may search for a DE set value as DE2, an SR set value as SR2, and a brightness set value as B2 among the image set values of the fourth texture area 533 from the database 140. Also, when an object type of the fifth texture area 541 is "person 2" and a texture type is a face as shown in FIG. 5C, the image set value searcher 121 may search for a DE set value as DE3, an SR set value as SR3, and a brightness set value as B3 among the image set values of the fifth texture area 541 from the database 140. Moreover, when an object type of the sixth texture area 543 is "person 2" and a texture type is clothes as shown in FIG. 5C, the image set value searcher 121 may search for a DE set value as DE4, an SR set value as SR4, and a brightness set value as $B_4$ among the image set values of the sixth texture area 543 from the database 140.

In addition, the image set value applier 123 may perform image processing by applying the image set values searched by the image set value searcher 121 to the respective texture areas.

The image processing apparatus 100 processes an image by applying different image set values to the same type of objects according to the locations and sizes of the objects as described above so that the user may watch a more natural and clearer image.

Figure 7:
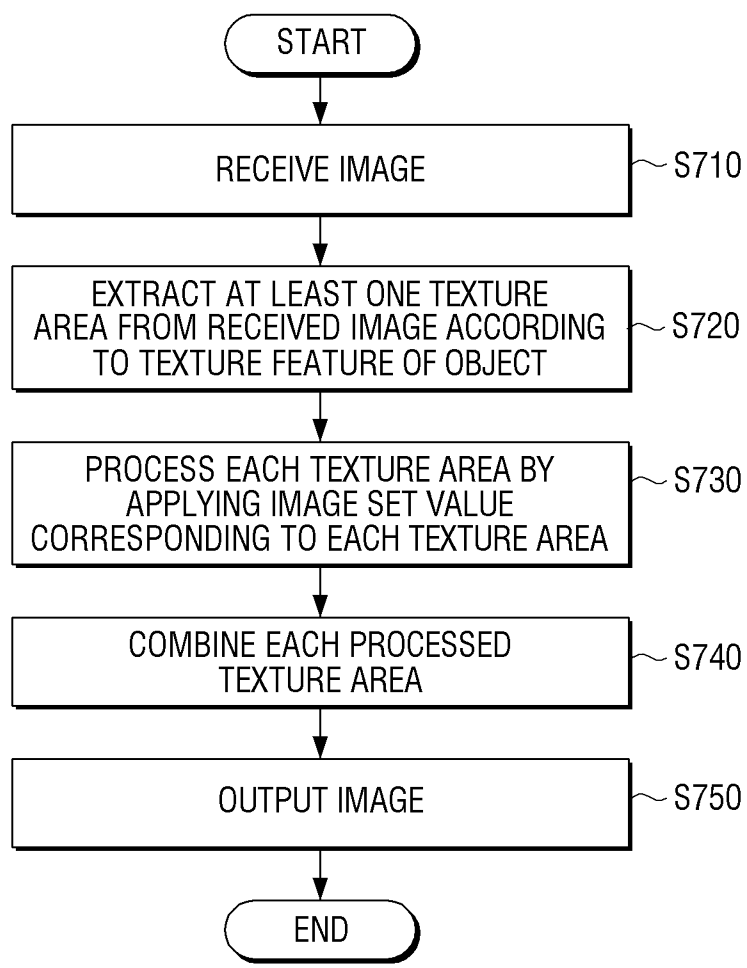
FIG. 7 is a flowchart of an image processing method according to an exemplary embodiment.

An image processing method according to an exemplary embodiment is described in greater detail with reference to FIG. 7.

The image processing apparatus 100 obtains (e.g., receives, captures, etc.) an image (operation S710). The image may include at least one object.

The image processing apparatus 100 extracts at least one texture area from the received image according to a texture feature of the object (operation S720). More specifically, the image processing apparatus 100 may extract the at least one object from the received image, separate at least one texture area from each extracted object, and thus extract the at least one texture area. At this time, the image processing apparatus 100 may also extract information regarding an object type and a texture type of the at least one texture area.

Subsequently, the image processing apparatus 100 processes the at least one texture area by applying an image set value corresponding to the at least one texture area (operation S730). More specifically, the image processing apparatus 100 may determine the type of the object and the type of the texture regarding the extracted texture area, and search for (e.g., obtain) an image set value corresponding to the determined type of the object and the determined type of the texture from among a plurality of image set values stored in the database 140. In addition, the image processing apparatus 100 may process each texture area by applying each searched image set value to each texture area.

The image processing apparatus 100 combines the at least one processed texture areas (operation S740).

Furthermore, the image processing apparatus 100 outputs the processed image (operation S750). The image processing apparatus 100 may display the image through a display, or transmit the image to an external display apparatus through an image output terminal.

The outputter 130 outputs an image processed by the image processor 120. The outputter 130 may be implemented with a display, but this is merely an exemplary embodiment. The outputter 130 may also be implemented with an image output terminal that outputs image data to an external display apparatus.

An apparatus according to one or more exemplary embodiments may include a processor, a memory that stores and executes program data, a permanent storage such as a disk drive, a communication port that communicates with an external apparatus, and a user interface apparatus such as a touch panel, a key, and a button. The methods that are implemented with a software module or an algorithm are codes or program commands that are executable on the processor and readable by a computer, and may be stored in a recording medium readable by a computer. The recording medium readable by a computer may include a magnetic storage medium (for example, a read-only memory, a random-access memory, a floppy disk, a hard disk, etc) and an optical readable medium (for example, a compact disk read-only memory (CD-ROM), a digital versatile disk (DVD), etc). The recording medium readable by a computer may disperse in computer systems that are connected over a network so that a code readable by a computer may be stored and executed in a dispersion method. The medium may be readable by a computer, be stored in a memory, and be executed by a processor. Furthermore, it is understood that one or more of the above-described elements may be implemented by circuitry, at least one processor, memory, etc.

One or more exemplary embodiments may be represented by functional block components and diverse processing steps. The functional blocks may be implemented with diverse numbers of hardware and/or software components that execute specific functions. For example, an exemplary embodiment may employ direct circuit components, such as a memory, processing, logic, and a look-up table, that execute diverse functions by control of one or more microprocessors or other control apparatuses. As the components are executed as software programming or software elements, the exemplary embodiments of the present invention may be realized in a programming or scripting language such as C, C++, Java, and assembler, including diverse algorithms that are implemented with data structure, processes, routines, or combination of other programming components. The functional factors may be implemented with an algorithm executed by one or more processors. In addition, the exemplary embodiments of the present invention may employ the related art for electronic configuration, signal processing, and/or data processing. The terms “mechanism”, “element”, “means”, and “component” may be used in a broad sense, and is not limited to mechanical or physical components. The terms may include a set of routines of software that are connected with a processor.

The foregoing exemplary embodiments and advantages are merely exemplary and are not to be construed as limiting the present inventive concept. For simplicity of the specification, electronic components, control systems, software, and other functional factors in the related art may be omitted. In addition, connection of lines or connection members between the components in the drawings illustrate functional connection and/or physical or circuital connection as example, and thus in a real apparatus, replaceable or additional diverse functional connection, physical connection or circuital connection may be provided.

In this specification and the claims, the use of the term “the” and similar referential terms may refer to both the singular and the plural. In addition, when a range is written, individual values within the range are included (if there is no contrary mention). Accordingly, it is the same as the individual values that compose the range are written in the detailed description. Furthermore, the operations that compose the method may be performed in appropriate order if the order is not obviously written or if there is no contrary mention. An exemplary embodiment is not always limited to the order in which the operations are written. The foregoing exemplary embodiments and advantages are merely exemplary and are not to be construed as limiting the present invention. Also, the description of exemplary embodiments is intended to be illustrative, and not to limit the scope of the claims, and many alternatives, modifications, and variations will be apparent to those skilled in the art.

What is claimed is:

1. An image processing method of an image processing apparatus, the method comprising:
- identifying an object from an input image by detecting a pixel having a difference of more than a predetermined value from a peripheral pixel from among input pixels;
- determining a type of the object by detecting a shape and a color of the identified object;
- dividing the object into a plurality of texture areas according to a texture feature;
- determining a type of a texture area using a shape, a color and a feature point of the divided texture areas;
- processing an image by applying an image setting value stored in a database to each texture area according to the type of the object and the type of the texture area; and
- outputting the processed image.

2. The method as claimed in claim 1, wherein the dividing the object into the plurality of texture areas comprises:
- extracting the object from the input image; and
- extracting the plurality of texture areas from the extracted object.

3. The method as claimed in claim 1, wherein the dividing the object into the plurality of texture areas comprises, for each texture area among the plurality of texture areas, extracting information regarding an object type and a texture type of the texture area.

4. The method as claimed in claim 3, wherein:
- a plurality of image set values respectively corresponding to object types and texture types are pre-stored in the database; and
- the processing the image comprises:
  - searching for an image set value, from among the plurality of image set values stored in the database, corresponding to the object type and the texture type determined for the texture area based on the information regarding the object type and the texture type, and processing the texture area using the searched image set value.

5. The method as claimed in claim 4, wherein the database has a hierarchical structure in which the object types are classified at an upper level and the texture types are classified at a lower level below the object types.

6. The method as claimed in claim 5, wherein the database stores different image set values according to different object types irrespective of a same texture type.

7. The method as claimed in claim 5, wherein image set values stored in the database for a plurality of texture types included in a same object are within a predetermined value range.

8. The method as claimed in claim 4, wherein the processing the image comprises, when a specific texture area among the plurality of texture areas is not included in the object types and the texture types stored in the database, the specific texture area is processed using a predetermined image processing value.

9. The method as claimed in claim 1, wherein:

the dividing comprises extracting a first texture area and a second texture area from the input image according to a first texture feature of the first texture area and a second texture feature of the second texture area; and the processing comprises processing the first texture area using a first image set value corresponding to the first texture area, and processing the second texture area using a second image set value, different from the first image set value, corresponding to the second texture area.

10. An image processing apparatus comprising:

an texture area extractor configured to identify an object from an input image by detecting a pixel having a difference of more than a predetermined value from a peripheral pixel from among input pixels, and to divide the object into a plurality of texture areas according to a texture feature;

an image processor configured to determine a type of the object by detecting a shape and a color of the identified object, to determine a type of a texture area using a shape, a color and a feature point of the divided texture areas, and to process an image by applying an image setting value stored in a database to each texture area according to the type of the object and the type of the texture area; and an outputter configured to output the processed image.

11. The image processing apparatus as claimed in claim 10, wherein the texture area extractor comprises:

an object extractor configured to extract the object from the input image; and a texture area separator configured to separate the plurality of texture areas from the extracted object.

12. The image processing apparatus as claimed in claim 11, wherein the texture area extractor is configured to, for each texture area among the plurality of texture areas, extract information regarding an object type and a texture type of the texture area.

13. The image processing apparatus as claimed in claim 12, wherein:

the database is configured to store a plurality of image set values respectively corresponding to object types and texture types; and wherein the image processor comprises:

an image set value searcher configured to search for an image set value, from among the stored plurality of image set values, corresponding to the object type and the texture type determined for the texture area based on the information regarding the object type and the texture type, and an image set value applier configured to process the texture area by applying the searched image set value to the texture area.

14. The image processing apparatus as claimed in claim 13, wherein the database has a hierarchical structure in which the object types are classified at an upper level and the texture types are classified at a lower level below the object types.

15. The image processing apparatus as claimed in claim 14, wherein the database stores different image set values according to different object types irrespective of a same texture type.

16. The image processing apparatus as claimed in claim 14, wherein image set values stored in the database for a plurality of texture types included in the same object are within a predetermined value range.

17. The image processing apparatus as claimed in claim 13, wherein when a specific texture area among the plurality of texture areas is not included in the object types and the texture types stored in the database, the image set value applier is configured to process the specific texture area by applying a predetermined image processing value to the specific texture area.

* * * * *